H. E. ADAMS.
COMBINED SOLDERING IRON AND BLOW TORCH.
APPLICATION FILED MAR. 12, 1909.
956,921.
Patented May 3, 1910.
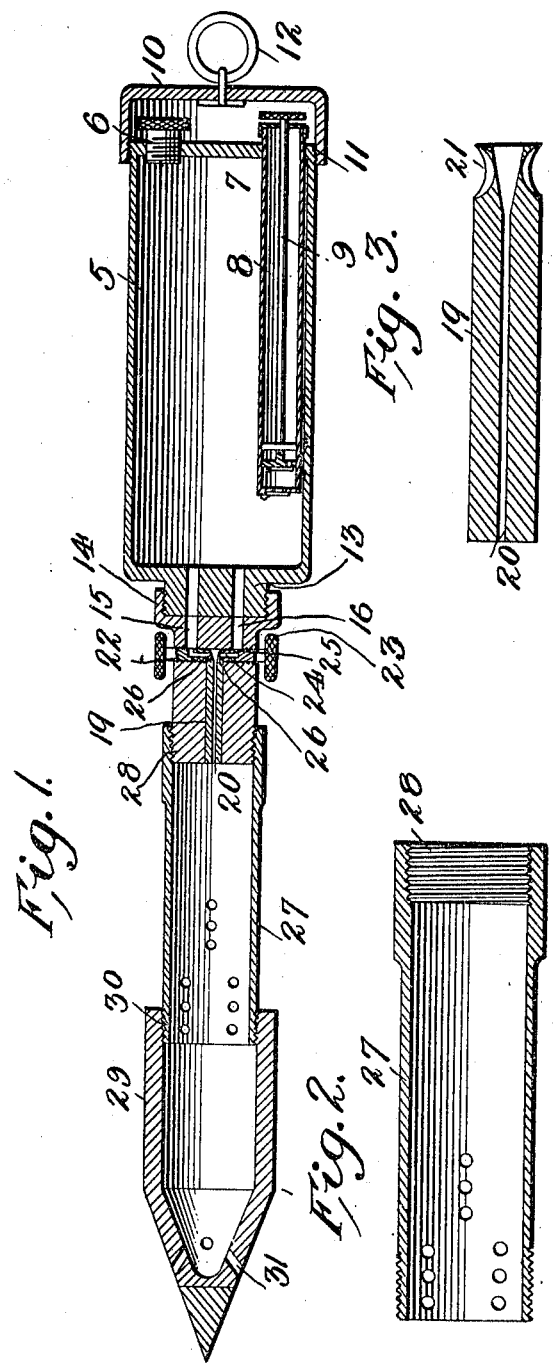
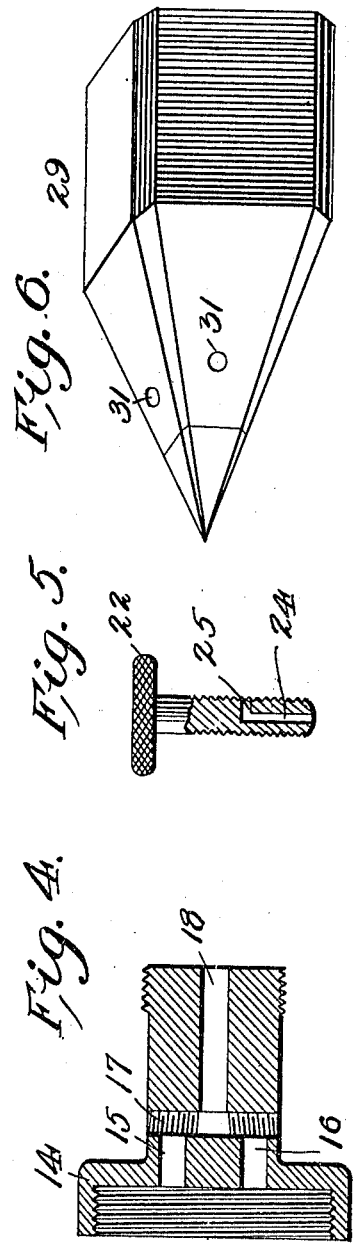
Witnesses
Jos. F. Collins.
A. M. Murray.
Inventor
Harry E. Adams
By Shepherd & Campbell
Attorneys

UNITED STATES PATENT OFFICE.

HARRY E. ADAMS, OF PITTSBURG, PENNSYLVANIA.

COMBINED SOLDERING-IRON AND BLOW-TORCH.

956,921. Specification of Letters Patent. Patented May 3, 1910.

Application filed March 12, 1909. Serial No. 482,941.

*To all whom it may concern:*

Be it known that I, HARRY E. ADAMS, a citizen of the United States of America, residing at Pittsburg, in the county of Allegheny and State of Pennsylvania, have invented certain new and useful Improvements in Combined Soldering-Irons and Blow-Torches, of which the following is a specification.

This invention relates to a combined blow torch and soldering iron, the primary object of the invention being to provide a soldering iron which is self-heating, and one that may be easily and readily handled by workmen occupying awkward and dangerous positions such as those occupied by linemen when soldering or bonding aerial electric wires.

A further object of the invention is the provision of means for converting the device into a blow torch when desired.

A further object of the invention is the provision of improved valve mechanism for controlling the flow of gasolene from the tank to the burner hereinafter described.

Further objects and advantages of the invention will be set forth in the detail description which now follows:

In the accompanying drawing, Figure 1 is a vertical longitudinal section of a device constructed in accordance with the invention, Fig. 2, is a detail sectional view of a blow torch head hereinafter described, Fig. 3 is a detail sectional view of a gasolene conducting tube hereinafter described, Fig. 4 is a detail view of a valve head, Fig. 5 is a detail view of a valve, and Fig. 6 is a perspective view of the soldering iron head.

Referring to the drawing, the numeral 5 designates a preferably tubular casing which forms the handle of the soldering iron and at the same time serves as a tank for the reception of gasolene or like fluid fuel. This fuel is admitted to the tank 5 through filling plug 6, said filling plug being threaded into the end 7 of the tank. An air pump 8 of the usual and well-known construction extends into the tank and the piston 9 thereof is accessible upon the exterior of the tank when the cap 10 is removed. This cap is threaded upon the tank at 11 and serves to protect the filling plug and the piston of the air pump. The cap is provided with a ring 12 by means of which the tool may be hung upon the belt of a workman or upon any suitable support adjacent his position. It will be appreciated that this is a highly desirable feature for the workman's hands are free to arrange the parts to be soldered in proper relation to each other, while at the same time, the soldering iron is being heated to a proper temperature for the soldering operation. When it is reflected that a great deal of soldering has to be done by linemen located in perilous positions and at extreme heights above the ground, the importance to the workman of being able to use his hands freely until the soldering actually has to be done, can not be over-estimated.

The forward portion of the tank 5 is provided with a neck 13 upon which a valve head 14 is threaded. The neck is longitudinally bored at 15 and 16 to provide ports for the passage of the fluid fuel. These ports terminate at and are in communication with a transverse port 17. This transverse port in turn is bisected by a longitudinal opening 18 into which a gasolene conducting tube 19 is driven. This gasolene conducting tube 19 has a comparatively minute opening 20 formed longitudinally therethrough, said opening flaring at its inner end where it communicates with a transverse opening 21. Valves 22 and 23 are threaded into the opposite ends of the port 17. These valves have passages 24 and 25 formed therethrough which communicate respectively with the ports 15 and 16 and with the minute opening 20 of the tube 18. The inner ends of these valves are rounded at 25 to give them a seating at 26 in the inner end of the tube 19, the walls of said tube being cut away as shown, to thus receive the inner ends of the valves. The object in providing the two valves 22 and 23 is this: A soldering iron requires but very little gasolene to keep it heated in comparison with the gasolene required for the blow torch. It is designed to have the ports in the valves of such capacity that when one of the valves is opened, the proper amount of gasolene for the soldering iron will be fed to the burner and when both of the valves are opened, the proper amount of gasolene for the blow torch will be fed to the burner. It is to be understood that the flow of fluid may be entirely cut off by rotating the valves to such positions that the ports 24 do not communicate with the ports 15 and 16.

The operation of the device is as follows: The tank 5 being filled with gasolene, the air pump which is of the usual construction and which requires no further description is actuated to force air into the tank. One of the valves being slightly opened, certain of the gasolene passes therethrough to the interior of blow torch head 27 which is threaded at 28 upon the end of the valve head 14. This gasolene may be then ignited through the openings 28 of the blow torch head. When the device is used as a blow torch, the soldering iron head 29 is omitted, but when the device is used as a soldering iron, this soldering iron head is threaded upon the end of the blow torch head at 30. As is clearly illustrated in Fig. 1, the soldering iron head is hollow and openings 31 extend from the interior thereof to the face of soldering iron head. These openings provide means for the escape of the products of combustion and permit the ready passage of the ignited fuel to the extreme front end of the hollow portion of the soldering iron head, thereby maintaining the desired degree of heat in said head and at the point thereof. It is of course apparent that instead of having the soldering iron head threaded upon the outer end of the blow torch head, said soldering iron head may be threaded directly upon the valve head in the place of the blow torch head, in which case the interior of the soldering iron head serves as the burner.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

Having described my invention, what I claim is:

1. In a device of the character described, the combination with a fuel receiving body portion, of a filling plug, an air compressing device, and a cap adapted to inclose said plug and a portion of said air compressing device.

2. In a device of the character described, the combination with a fuel receiving body portion, of a filling plug, an air compressing device, a cap adapted to inclose said plug and a portion of said air compressing device, and a suspending member carried by said cap.

3. A valve mechanism comprising a head having a longitudinally disposed discharge port formed therein, transverse ports extending in opposite directions through said head and from said discharge port a longitudinal port communicating with each of the transverse ports and an independent valve threaded into each of the transverse ports and adapted to control the passage of fluid through said ports.

4. In a device of the character described, the combination with a fuel receiving body portion having a neck, of a valve head threaded upon said neck, a pair of independently actuated valves carried by said valve head, a common discharge port from said valve head, a blow torch head threaded upon said valve head, and a soldering iron head threaded upon said blow torch head.

5. In a device of the character described, the combination with a fuel receiving body portion having a neck, of a valve head threaded upon said neck, a pair of independently actuated valves carried by said valve head, a common discharge port from said valve head, a blow torch head threaded upon said valve head, and a soldering iron head threaded upon said blow torch head, said soldering iron head being hollow and there being diagonal openings formed through the wall of the soldering iron head from the forward end of the hollow portion thereof to the face thereof.

6. In a device of the character described, the combination with a fuel receiving body portion having a neck, of a valve head threaded upon said neck, a pair of independently actuated valves carried by said valve head, a common discharge port from said valve head, a blow torch head threaded upon said valve head, a soldering iron head threaded upon said blow torch head, said soldering iron head being hollow and there being diagonal openings formed through the wall of the soldering iron head from the forward end of the hollow portion thereof to the face thereof, a filling plug, an air compressing pump, and a cap adapted to be threaded upon the body portion and to inclose a portion of said pump and said filling plug.

In testimony whereof I affix my signature in presence of two witnesses.

HARRY E. ADAMS.

Witnesses:
A. E. CAMPBELL,
GEO. KNAUFF.